United States Patent
Lei et al.

(10) Patent No.: US 11,599,753 B2
(45) Date of Patent: Mar. 7, 2023

(54) DYNAMIC FEATURE SELECTION FOR MODEL GENERATION

(71) Applicant: Oracle International Corporation, Redwood Shores, CA (US)

(72) Inventors: Ming Lei, Ellicott City, MD (US); Catalin Popescu, Atlanta, GA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1465 days.

(21) Appl. No.: 15/844,991

(22) Filed: Dec. 18, 2017

(65) Prior Publication Data
US 2019/0188536 A1    Jun. 20, 2019

(51) Int. Cl.
*G06Q 30/02*    (2012.01)
*G06K 9/62*     (2022.01)
(Continued)

(52) U.S. Cl.
CPC ........... *G06K 9/6262* (2013.01); *G06F 17/10* (2013.01); *G06K 9/6256* (2013.01);
(Continued)

(58) Field of Classification Search
CPC .. G06K 9/6262; G06K 9/6256; G06K 9/6269; G06F 17/10; G06N 20/00; G06Q 30/0202; G06Q 50/28; G06V 10/98
See application file for complete search history.

(56) References Cited

U.S. PATENT DOCUMENTS

| 8,620,707 B1 | 12/2013 | Belyi et al. |
| 2005/0288993 A1 | 12/2005 | Weng et al. |

(Continued)

FOREIGN PATENT DOCUMENTS

| JP | 2009104408 A | 5/2009 |
| JP | 2015076091 A | 4/2015 |
| WO | 2016148107 A1 | 9/2016 |

OTHER PUBLICATIONS

International Search Report issued in the corresponding PCT Application No. PCT/US2018/058919 dated Jan. 29, 2019.
(Continued)

*Primary Examiner* — Howard D Brown, Jr.
(74) *Attorney, Agent, or Firm* — Potomac Law Group, PLLC

(57) ABSTRACT

Embodiments generate a model of demand of a product that includes an optimized feature set. Embodiments receive sales history for the product and receive a set of relevant features for the product and designate a subset of the relevant features as mandatory features. From the sales history, embodiments form a training dataset and a validation dataset and randomly select from the set of relevant features one or more optional features. Embodiments include the selected optional features with the mandatory features to create a feature test set. Embodiments train an algorithm using the training dataset and the feature test set to generate a trained algorithm and calculate an early stopping metric using the trained algorithm and the validation dataset. When the early stopping metric is below a predefined threshold, the feature test set is the optimized feature set.

20 Claims, 10 Drawing Sheets

(51) Int. Cl.
  *G06F 17/10* (2006.01)
  *G06Q 50/28* (2012.01)
  *G06N 20/00* (2019.01)
  *G06Q 30/0202* (2023.01)
  *G06V 10/98* (2022.01)

(52) U.S. Cl.
  CPC ........... *G06K 9/6269* (2013.01); *G06N 20/00* (2019.01); *G06Q 30/0202* (2013.01); *G06Q 50/28* (2013.01); *G06V 10/98* (2022.01)

(56) References Cited

U.S. PATENT DOCUMENTS

| | | | |
|---|---|---|---|
| 2008/0059280 A1* | 3/2008 | Tellefsen | G06Q 30/0283 705/7.31 |
| 2012/0209660 A1* | 8/2012 | McCaffrey | G06Q 30/0283 705/7.31 |
| 2013/0325558 A1* | 12/2013 | Rosenberg | G06Q 30/0202 705/7.35 |
| 2014/0129294 A1* | 5/2014 | Rosenberg | G06Q 30/0283 705/7.35 |
| 2014/0289167 A1* | 9/2014 | Rosenberg | G06Q 30/0283 705/400 |
| 2015/0100295 A1 | 4/2015 | Jetcheva et al. | |
| 2015/0100384 A1* | 4/2015 | Ettl | G06Q 30/0206 705/7.35 |
| 2015/0178751 A1* | 6/2015 | Preston | G06Q 30/0206 705/7.34 |
| 2016/0055426 A1 | 2/2016 | Aminzadeh et al. | |
| 2016/0210591 A1 | 7/2016 | Lafrance | |
| 2017/0068973 A1 | 3/2017 | Sinkel | |
| 2017/0083967 A1 | 3/2017 | Shiely et al. | |
| 2017/0169446 A1 | 6/2017 | Li et al. | |
| 2017/0255952 A1 | 9/2017 | Zhang et al. | |
| 2018/0101876 A1* | 4/2018 | Rosenberg | G06Q 30/0283 |
| 2018/0341898 A1* | 11/2018 | Bose | G06Q 30/0202 |
| 2019/0188536 A1* | 6/2019 | Lei | G06K 9/6269 |
| 2020/0380409 A1* | 12/2020 | Seo | G06N 3/0454 |
| 2021/0357959 A1* | 11/2021 | Cella | G06Q 10/0631 |

OTHER PUBLICATIONS

"Oracle Retail Demand Forecasting", Datasheet; Retrieved on Oct. 31, 2017 from www.oracle.com/us/products/applications/062067.pdf.

* cited by examiner

| Feature # | 1 | 2 | 3 | 4 | 5 | 6 | 7 | 8 | 9 | 10 |
|---|---|---|---|---|---|---|---|---|---|---|
| Name | Seasonality | Price | Brand | Package size | Item size | Flavour | Color | In store display | End Cap | Bogo |

FIG. 3

| Merchandise | Location | Early stopping | Round # | Early Stopping threshold value | Max iteration | Iteration # | Selected feature# | Early stopping metric | Stop |
|---|---|---|---|---|---|---|---|---|---|
| Yogurt | Baltimore, MD | MAPE | 1 | 10 | 15 | 1 | 1,2,3,6,10,4,8 | 20 | NO |
| | | | | | | 2 | 1,2,3,6,10,4,9 | 15 | NO |
| | | | | | | 3 | 1,2,3,6,10,5,9 | 11 | NO |
| | | | | | | 4 | 1,2,3,6,10,5,7 | 9.5 | Yes |
| | | | 2 | 10 | 12 | 1 | 1,2,3,6,10,4,7 | 11 | NO |
| | | | | | | 2 | 1,2,3,6,10,4,8 | 15 | NO |
| | | | | | | 3 | 1,2,3,6,10,5,7,8,9 | 18 | NO |
| | | | | | | 4 | 1,2,3,6,10,4,5,7,9 | 16 | NO |
| | | | | | | 5 | 1,2,3,6,10,4,5,7 | 22 | NO |
| | | | | | | 6 | 1,2,3,6,10,4,8,9 | 8.9 | Yes |
| | | | 3 | 8 | 15 | 1 | 1,2,3,6,10,4,7,9 | 20 | NO |
| | | | | | | 2 | 1,2,3,6,10,4,8 | 32 | NO |
| | | | | | | ... | ... | ... | NO |
| | | | | | | 14 | 1,2,3,6,10,4,5,7,9 | 16 | NO |
| | | | | | | 15 | 1,2,3,6,10,4,5,7 | 22 | Yes |

| Output Model | Comments |
|---|---|
| | |
| | |
| | |
| 1,2,3,6,10,5,9,7 | Find the model which meet the threshold |
| | |
| | |
| | |
| 1,2,3,6,10,4,8,9 | |
| | |
| | |
| | Reached max interation STOP. No model is found. |

Promo effects estimation

| Type | Rounds | promo 1 | promo 2 | promo 3 | promo 4 | promo 5 | promo 6 | promo 7 | promo 8 | promo 9 | promo 10 | RMSE (i) | w(i) | w'(i) |
|---|---|---|---|---|---|---|---|---|---|---|---|---|---|---|
| Include all Data points | A | 1.09 | 1.21 | 1.56 | 3.2 | 2.12 | 1.12 | 2.12 | 3.15 | 1.6 | 1.78 | NA | NA | NA |
| Sampling with replacement 80% for training and 20% for testing | 1 | 1.16 | 1.14 | 1.57 | 3.14 | 2.03 | 1.14 | 2.06 | 3.19 | 1.54 | 1.79 | 9.75 | 0.093023 | 0.144835 |
| | 2 | 1.12 | 1.25 | 1.58 | 3.11 | 2.13 | 1.02 | 2.15 | 3.17 | 1.63 | 1.70 | 4.77 | 0.17331 | 0.269841 |
| | 3 | 1.06 | 1.13 | 1.49 | 3.14 | 2.06 | 1.06 | 2.13 | 3.15 | 1.60 | 1.81 | 6.39 | 0.135318 | 0.210687 |
| | 4 | 1.06 | 1.23 | 1.48 | 3.10 | 2.04 | 1.07 | 2.15 | 3.08 | 1.54 | 1.80 | 5.94 | 0.144092 | 0.224349 |
| | 5 | 1.04 | 1.14 | 1.56 | 3.25 | 2.02 | 1.04 | 2.02 | 3.19 | 1.51 | 1.72 | 9.36 | 0.096525 | 0.150288 |

FIG. 6

Forecast Estimation

| At one given store/sku | | Week 1 | Week 2 | Week 3 | Week 4 | Week 5 |
|---|---|---|---|---|---|---|
| 701 | baseline | 200 | 200 | 200 | 200 | 200 |
| 702 | seasonality | 1.1 | 1.2 | 1.5 | 1.6 | 1.7 |
| 703 | promo 1 | x | | | | |
| 704 | promo 2 | | x | | | |
| 705 | promo 3 | | | | x | |
| 706 | promo 4 | | | | | |
| 707 | promo 5 | | | | | |
| 708 | promo 6 | | | | | |
| 709 | promo 7 | | | | | |
| 710 | promo 8 | | | | | |
| 711 | promo 9 | | | x | | |
| 712 | promo 10 | | | | | |
| 713 | Actual sales | 242 | 286 | 465 | 480 | 340 |
| 714 | PREDICT ROUND A | 239.8 | 290.4 | 480 | 499.2 | 340 |
| 715 | ROUND 1 | 255.241 | 272.5578 | 461.1735 | 501.3791 | 340 |
| 716 | ROUND 2 | 246.9645 | 301.0822 | 488.2887 | 504.2234 | 340 |
| 717 | ROUND 3 | 233.5692 | 271.8177 | 481.0587 | 478.1017 | 340 |
| 718 | ROUND 4 | 233.1904 | 295.6165 | 461.8454 | 474.4456 | 340 |
| 719 | ROUND 5 | 228.9424 | 273.5752 | 452.5576 | 499.5444 | 340 |
| 720 | Final | 239.5422 | 285.4249 | 471.5356 | 490.9239 | 340 |

FIG. 7A

| Week 6 | Week 7 | Week 8 | Week 9 | Week 10 | Week 11 | Week 12 | Week 13 | RMSE |
|---|---|---|---|---|---|---|---|---|
| 200 | 200 | 200 | 200 | 200 | 200 | 200 | 200 | |
| 1.62 | 1.53 | 1.5 | 1.45 | 1.38 | 1.3 | 1.2 | 1.15 | |
| | | | | | | | | |
| | | | | x | | | | |
| | | | x | | | | | |
| | x | | | | | | | |
| | | | | | x | | | |
| x | | | | | | | | |
| | | | | | | x | | |
| | | | | | | | x | |
| 1030 | 339 | 300 | 913 | 414 | 819 | 372 | 414 | |
| 1020.6 | 342.72 | 300 | 928 | 430.56 | 832 | 384 | 409.4 | 10.93137 |
| 1033.197 | 349.7458 | 300 | 910.2882 | 432.4394 | 816.1205 | 368.9388 | 410.5803 | 10.11527 |
| 1025.931 | 312.8731 | 300 | 901.1671 | 434.8927 | 807.943 | 390.6309 | 390.9204 | 16.77679 |
| 1020.774 | 325.5198 | 300 | 909.7985 | 412.3627 | 815.6814 | 384.8469 | 415.1914 | 8.730741 |
| 999.2002 | 327.3192 | 300 | 899.1558 | 409.2093 | 806.1396 | 369.4763 | 412.9149 | 11.37984 |
| 1033.136 | 319.0551 | 300 | 941.7397 | 430.857 | 844.3183 | 362.0461 | 394.9165 | 16.37002 |
| 1020.982 | 325.048 | 300 | 909.9527 | 423.4219 | 815.8197 | 377.2284 | 404.4163 | 7.188404 |

FIG. 7B

DYNAMIC FEATURE SELECTION FOR MODEL GENERATION

FIELD

One embodiment is directed generally to a computer system, and in particular to a computer system that dynamically selects features for model generation.

BACKGROUND INFORMATION

Products are typically delivered to consumers through a network of manufacturers, distributors, transporters, retailers, etc. Such a network of facilities that together deliver products to consumers is commonly referred to as a "supply chain" network Suppliers of products (e.g., manufactures, vendors, retailers, etc.) often face the task of forecasting the demand for the products in order to provide a smooth and efficient flow of the products through the supply chain network in the presence of constantly-changing market conditions. Overestimating the demand can result in overproduction and increased costs associated with holding inventories (e.g., storage costs, obsolescence, etc.). Underestimating the demand, on the other hand, can result in lost revenues.

Further, in the retail industry, retailers need to predict their demand in the future to better manage their inventory or promotion/markdown planning. Retailers may engage in many types of promotion to boost their sales. To generate an accurate forecast, a retailer has to consider all factors/features which could impact the demand, such as promotions, price, seasonality, weather, etc.

One technique for forecasting demand for a product is to forecast the demand based primarily on historical demand information for that product (e.g., based on past purchase orders, past shipments, past point-of-sales data, and so on). However, such a technique may poorly adapt to the ever-changing market conditions and can result in an inaccurate forecast. Further, with more and more factors to consider, the traditional forecast method such as time series analysis or regression does not work very well.

SUMMARY

Embodiments generate a model of demand of a product that includes an optimized feature set. Embodiments receive sales history for the product and receive a set of relevant features for the product and designate a subset of the relevant features as mandatory features. From the sales history, embodiments form a training dataset and a validation dataset and randomly select from the set of relevant features one or more optional features. Embodiments include the selected optional features with the mandatory features to create a feature test set. Embodiments train an algorithm using the training dataset and the feature test set to generate a trained algorithm and calculate an early stopping metric using the trained algorithm and the validation dataset. When the early stopping metric is below a predefined threshold, the feature test set is the optimized feature set and when the early stopping metric is not below the predefined threshold, embodiments repeat the randomly selecting, the training and the calculating.

BRIEF DESCRIPTION OF THE DRAWINGS

FIG. 3 illustrates a simplified example of a feature set for a product in accordance with embodiments of the invention.

FIG. 4 illustrates an example of the output of the functionality of FIG. 2 using the feature set example of FIG. 3 after three rounds are executed in accordance with one embodiment.

FIG. 6 illustrates six rounds of model estimation using the data points in accordance with one embodiment.

FIG. 7 illustrates a comparison of predictions using embodiments of the invention and actual sales.

DETAILED DESCRIPTION

Figure 1:
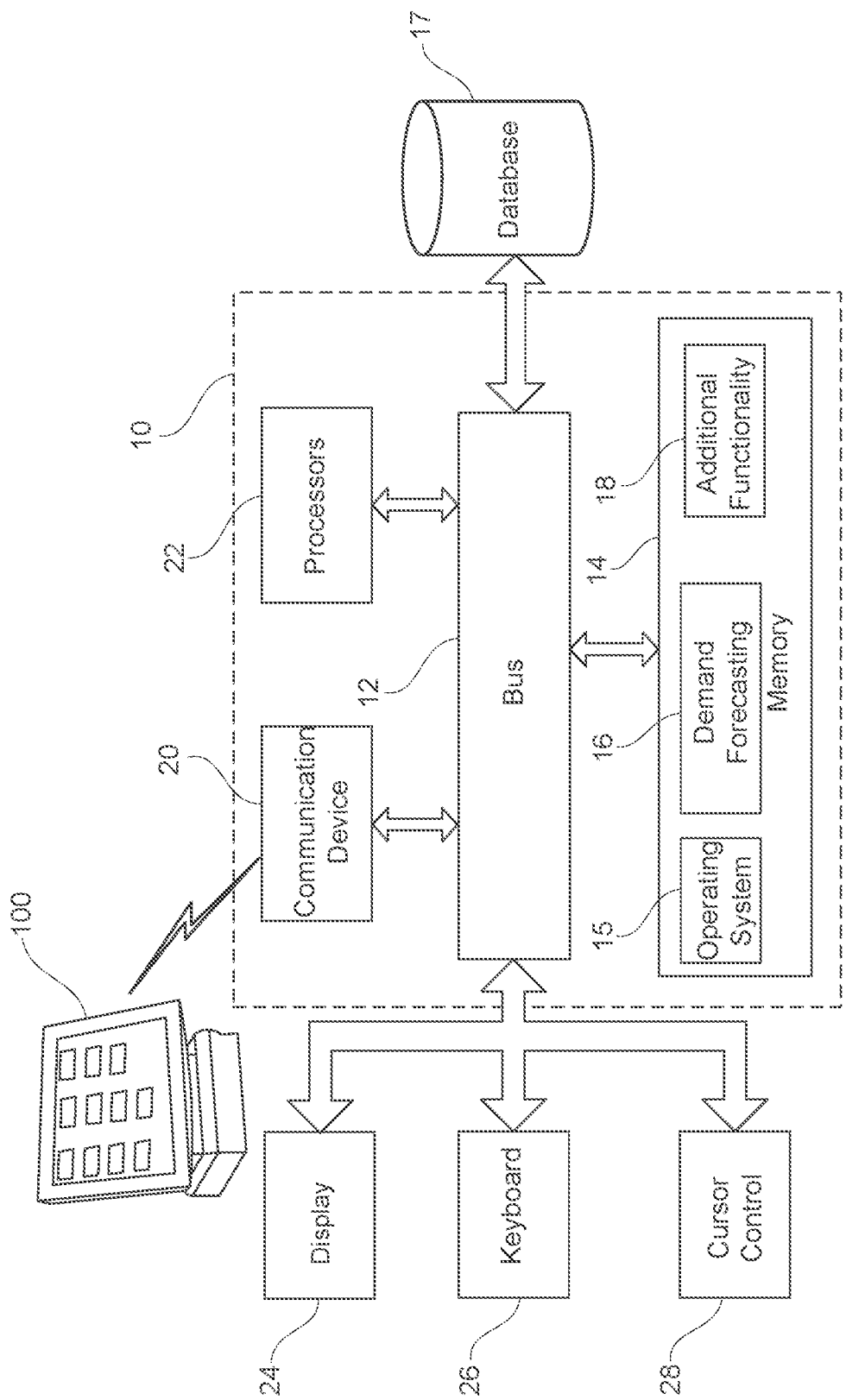
FIG. 1 is a block diagram of a computer server/system in accordance with an embodiment of the present invention.

One embodiment determines a set of relevant features for an item in order to determine a demand forecast for the item. The set of features include mandatory features and optional features. The determined features are used to train one or more models that are subsequently used to generate the demand forecast.

Sales and demand forecasting methods can roughly be grouped into judgmental, extrapolation and causal methods. Extrapolation methods use only the time series data of the activity itself to generate the forecast. Known particular algorithms/methods range from the simpler moving averages and exponential smoothing methods to the more complicated Box-Jenkins approach. While these known methods identify and extrapolate time series patterns of trend, seasonality and autocorrelation successfully, they do not take external factors such as price changes and promotion into account.

Vector Auto Regression ("VAR") methods extend the Box-Jenkins methods to include other variables, but their complexity makes estimation difficult. Causal forecasting involves building quantitative models using inputs representing the phenomena that are believed to be drivers of the outcome. The methods can be as simple as a linear regression algorithm with promotion variables. A starting point is a regression model with promotion variables such as price cuts, rebates or advertisements. The idea is that model simplicity helps managers to understand and approve or guide modification of the models, and as they become more knowledgeable about a decision aid, they may be ready to implement more sophisticated and complex models.

In order to improved demand forecasting, retailers have begun to move to modern machine learning technologies, such as support vector machine ("SVM"), artificial neural network ("ANN"), random forest, and so on. However, typically a retailer will just pick one model for each product/location. As used herein, a retailer can include a single retail store, or can include a large amount of retail stores all integrated and managed by single or multiple logistic operations.

Further, for many machine learning algorithms (SVM, ANN, random forest, etc.), retailers will use a feature set (i.e., various attributes of an item) to define the data point at the product/location/calendar intersection. In these algorithms, retailers will train the model with the same feature set as it does for forecasting. Further, the same feature set could be used by several different algorithms for forecasting. A "feature set" is the collection of features that impact the demand or sales for an item as well as describe attributes of an item. Examples of features include base sales, price, seasonality, brand, promotions, size, color, pack size, supplier, length, etc. While features such as price and seasonality may be relevant for all types of products, some others are item specific. For example, pack size impacts the demand for yogurts, however the length of the pack is insignificant. Conversely, the brand is very important for fashion items, but is much less important for hardware items, such as nails or hammers.

In order to generate an accurate forecast, a retailer has to consider all factors/features which could impact the demand/sales such as promotions, price change, seasonality, weather and so on. However, a possible feature set may become so large, such as 20-50 different possible features, that traditional demand forecast tools such as linear regression cannot handle so many independent variables. Although there may be no limit to how many features are needed in order to get a more accurate demand forecast, some of the features which are important for one item/location may not be as important for another item/location.

Known solutions use a "rule of thumb" technique to generate a set of features for demand forecasting. In contrast with known approaches, embodiments automatically determine feature sets by starting with a set of "mandatory" features that must be included in any feature set, and then determining optimal "optional" features to complete the feature set.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 1, such as a keyboard or display.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a demand forecasting module 16 that determines optimal feature sets for demand forecasting, and all other functionality disclosed herein. System 10 can be part of a larger system. Therefore, system 10 can include one or more additional functional modules 18 to include the additional functionality, such as a retail management system (e.g., the "Oracle Retail Demand Forecasting System" or the "Oracle Retail Advanced Science Engine" ("ORASE") from Oracle Corp.) or an enterprise resource planning ("ERP") system. A database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data. In one embodiment, a specialized point of sale ("POS") terminal 100 generates the transactional data and historical sales data (e.g., data concerning transactions of each item/SKU at each retail store) used to forecast demand. POS terminal 100 itself can include additional processing functionality to forecast demand in accordance with one embodiment.

In one embodiment, particularly when there are a large number of retail stores, a large number of items, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Embodiments use the automatically determined one or more feature sets to generate one or more trained models generated from one or more different algorithms in order to determine a sales forecast or a demand forecast. The forecast is an important driver of the supply chain. If a forecast is inaccurate, allocation and replenishment perform poorly, resulting in financial loss for the retailer. Improvements in forecast accuracy for promoted or non-promoted items may be achieved by the embodiments disclosed herein. Further, a better understanding of the impact a promotion has on demand may be achieved. This helps the retailer to more effectively plan promotions with respect to channel, pricing, and customer segments, for example.

Embodiments are disclosed from the perspective that, for an item (i.e., a class of items such as yogurt or men's shirts) sold at a location (e.g., a retail location), the item may be promoted in various ways at various times (i.e., pre-defined retail periods, such as a day, week, month, year, etc.). A retail calendar has many retail periods (e.g., weeks) that are organized in a particular manner (e.g., four (4) thirteen (13) week quarters) over a typical calendar year. A retail period may occur in the past or in the future. Historical sales/performance data may include, for example, a number of units of an item sold in each of a plurality of past retail periods as well as associated promotion data (i.e., for each retail period, which promotions were in effect for that period).

As disclosed below, embodiments use one or more trained models generated from one or more different algorithms and one or more feature sets, and may ultimately combined the forecast from multiple trained models to arrive at a final demand forecast. Trained models used in some embodiments can include trained linear regression models or machine learning techniques, such as decision or regression trees, Support Vector Machines ("SVM") or neural networks.

In connection with trained linear regression models, generated from a linear regression algorithm trained with different inputs and feature sets, the search for a linear relationship between an output variable and multiple input variables has resulted in stepwise selection of input variables in a regression setting. In some embodiments, the goal is to build a function that expresses the output variable as a linear function of the input variables plus a constant. Two general approaches in stepwise regression are forward and backward selection.

In forward selection, variables are introduced one at a time based on their contribution to the model according to a pre-determined criterion. In backward selection, all input variables are built into the model to begin with, and then input variables are removed from the regression equation if they are judged as not contributing to the model, again based on a predetermined criterion.

In machine learning, SVMs are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall.

In addition to classification, SVMs have been successfully applied in sales or demand forecasting, being able to process common metrics, such as sales, as well as price, promotions, external factors such as weather and demographic information.

SVM and its regression version of Support Vector Regression ("SVR") implicitly map instances into a higher dimensional feature space using kernel functions. In its most basic form, SVR ideally seeks to identify a linear function in this space that is within a distance to the mapped output points. This "soft margin formulation" allows and penalizes deviations beyond the pre-determined distance, and minimizes the sum of violations along with the norm of the vector that identifies the linear relationship A regression tree technique partitions the data into smaller subsets in a decision tree format and fits a linear regression model at every leaf that is used to predict the outcome. Alternative model tree approaches differ from each other mainly in the choice criteria of the input variable to be branched on, split criteria used, and the models constructed at every leaf of the tree. While trees are transparent in the sense that the prediction for a particular case can be traced back to the conditions in the tree and the regression function that is applicable for cases that satisfy those conditions, trees with many layers are not easy to interpret in a generalizable manner.

An Artificial Neural Network ("ANN") is an information processing paradigm that is inspired by the way biological nervous systems, such as the brain, process information. The key element of this model is the novel structure of the information processing system. It is composed of a large number of highly interconnected processing elements (i.e., neurons) working in unison to solve specific problems. ANNs learn by example. An ANN is configured for a specific application, such as pattern recognition or data classification, through a learning process. Learning in biological systems involves adjustments to the synaptic connections that exist between the neurons. This is true of ANNs as well. Since neural networks are best at identifying patterns or trends in data, they are well suited for prediction or forecasting needs.

Figure 2:
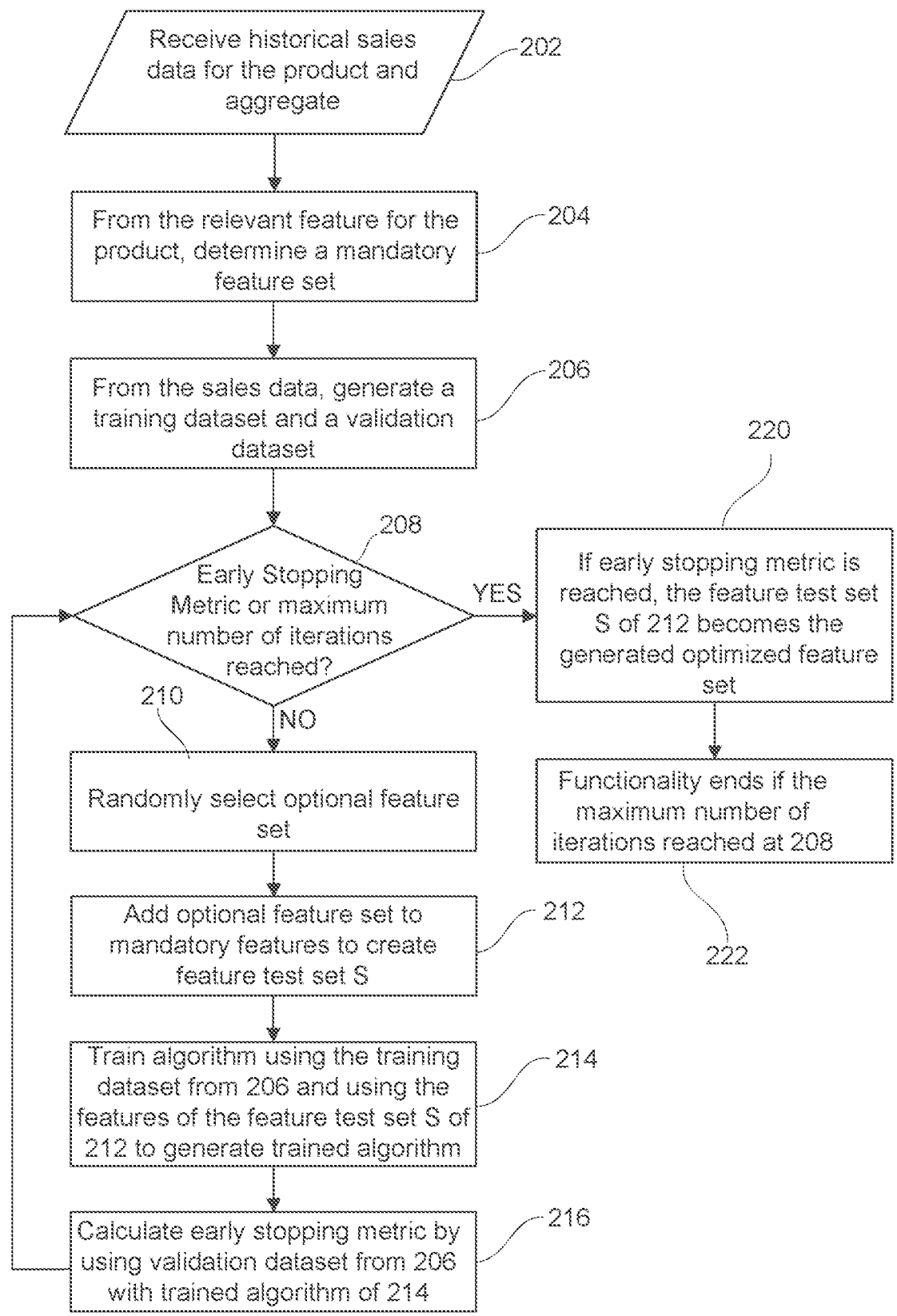
FIG. 2 is a flow diagram of the functionality of the demand forecast module of FIG. 1 when determining one or more optimized feature sets, that each include mandatory features and one or more optional features, and that can be used for a demand forecast in accordance with one embodiment.

FIG. 2 is a flow diagram of the functionality of demand forecast module 16 of FIG. 1 when determining one or more optimized feature sets, that each include the mandatory features and one or more optional features, and that can be used for a demand forecast in accordance with one embodiment. In one embodiment, the functionality of the flow diagram of FIG. 2 (and FIG. 5 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, historical item sales data is received for all items for all stores for a particular class/category of products, or for only a single item of interest. For example, the class/category can be "yogurt", "coffee" or "milk." Each class has one or more subclasses, all the way down to the SKU or Universal Product Code ("UPC") level, which would be each individual item for sale, For example, for the class of yogurt, a sub-class could be each brand of yogurt, and further sub-classes could be flavor, size, type (e.g., Greek or regular), down to an SKU which would correspond to every individual different type of yogurt item sold. In one embodiment, the determined feature set that is generated from the functionality of FIG. 2 is for a given product (i.e. category at a given location, such as yogurt in the Baltimore, Md. area).

Historical sales and performance data may include, for example, data representing past sales and promotions of an item across a plurality of past retail periods. The historical performance data may be segmented into retail periods of past weeks, with each past week having numerical values assigned to it to indicate the number of items sold for that week. The historical performance data may also include numerical values representing price discounts and values of other promotion components across the retail periods, in accordance with one embodiment. The historical performance data for an item may be accessed via network communications, in accordance with one embodiment, including being accessed from each POS terminal 100 at each retail store and/or accessed from database 17.

The historical performance data includes sales data associated with the plurality of promotion components across a plurality of time periods (e.g., weeks). Examples of promotion components include, but are not limited to, a price discount component, a television advertisement component, a radio advertisement component, a newspaper advertisement component, an email advertisement component, an internet advertisement component, and an in-store advertisement component.

All the valid data points are pooled to form a training dataset D with N data points at a given aggregated level. Aggregate levels are intersections higher than SKU/store/week at which the data is pooled. An example of an aggregate level is subclass/store. The data available at this level is determined by all SKUs in a particular subclass. The aggregate levels in embodiments are typically picked to be low enough to capture the low level details of the merchandise, but also high enough that the data pool is rich enough for a robust estimation of the promotion effects. Another example aggregate level is product line/geographic area, such as all yogurt sold in the Baltimore, Md. area.

At 204, a set of relevant features for the product is received. Each feature describes the product and may impact the product's sales. Out of all of the features, a mandatory feature set ("M") is identified. In one embodiment, the mandatory feature set can be identified manually by the retailer themselves, based on past knowledge or personal preferences. For example, a retailer may believe, for t-shirts, that "color" is a mandatory feature even if past data indicates that it has a relatively small impact on demand/sales. In another embodiment, the list of mandatory features can be automatically generated based on previous sales history. The remaining features of the feature set are then considered the optional feature set ("O").

FIG. 3 illustrates a simplified example of a feature set for a product in accordance with embodiments of the invention. In the example of FIG. 3, the product is yogurt, and the feature set includes 10 features: seasonality, price, brand, package size, item size, flavor, color, in-store display, end cap and a buy one get one free ("Bogo") promotion (i.e., feature numbers 1-10). The shaded features (seasonality, price, brand, flavor and Bogo) form the mandatory feature set of (1, 2, 3, 6, 10). The remaining features (package size, item size, color, in-store display and end cap) form the optional feature set of (4, 5, 7, 8, 9). Although the simplified example shown in FIG. 3 includes only 10 total features, in actuality the feature set for a product may include 50-100 features.

At 206, all or a subset of the sales history data for the product is extracted (e.g., two years of sales history for yogurt in the Baltimore, area). A randomly selected portion of the sales history data is used as a training dataset, and the remainder is used as a validation dataset. In one embodiment, 80% of the sales history is randomly selected to form the training dataset, and the remaining 20% is used to form the validation dataset.

At 208, an early stopping metric that has been received/selected determines when the iterative process will be completed and the optimized feature set is determined. In one embodiment, mean absolute percentage error ("MAPE") is used and is compared to an error threshold "e". Further, a maximum number of iterations is received and also determines when the iterative process is completed if an optimized feature set is not determined. At 208, it is determined if the early stopping metric or the maximum number of iterations has been reached.

If no at 208, at 210 features in the optional feature set O are randomly selected and placed in a feature test set "S". The number of optional features added to set S is also random. The functionality of 210 may be repeated many times, and the optional features as well as how many of them are included may vary every time, until a satisfactory combination of mandatory and optional features is found.

At 212, all of the mandatory features of the set M are added into the set S.

At 214, an algorithm is trained using the training data set from 206 and using the features of feature test set S (i.e., both the mandatory and optional features) to generate a trained algorithm (i.e., the model). The algorithm to be trained can be any desired algorithm such as disclosed above (e.g., linear regression, ANN, etc.)

At 216, the early stopping metric is calculated by applying the trained algorithm (i.e., the model) on the validation dataset and functionality continues at 208 where it is determined if the early stopping metric is below the threshold e or maximum iterations are reached. Therefore, steps 210, 212, 214 and 216 are repeated.

An example of 216, where the early stopping metric is MAPE, is as follows:

$$MAPE = \frac{100}{N} \sum_{i=1}^{N} \frac{|\text{predicted value}(i) - \text{actual value}(i)|}{|\text{actual value}(i)|}$$

Suppose there are three time periods, which would make N=3. Assume that the predicted values for the three periods are:
Predicted value (i=1)=3
Predicted value (i=2)=2
Predicted value (i=3)=1
Assume that the actual values are:
Actual value (i=1)=1
Actual value (i=2)=2
Actual value (i=3)=3
The formula then becomes:

$$MAPE = \frac{100}{3}\left(\frac{|3-1|}{1} + \frac{|2-2|}{2} + \frac{|1-3|}{3}\right)\% = \frac{8*100}{9}\% = 88.89\%.$$

If the early stopping metric is reached at 208, then at 220 the optimized feature set is feature test set S of 212.

If the maximum number of iterations is reached without arriving at an optimized feature set, the functionality ends at 222. In one embodiment, the threshold e may then be increased and functionality may continue at step 206.

In one embodiment, multiple rounds of the functionality of FIG. 2 are executed in order to produce multiple optimized feature sets. Each feature set can be used as input into a forecasting algorithm to generate forecasting trained models. The multiple trained models can then be aggregated to generate a demand forecast, as disclosed in detail below in conjunction with FIG. 5. The output of the functionality of FIG. 2 is one or more optimized feature sets.

FIG. 4 illustrates an example of the output of the functionality of FIG. 2 using the feature set example of FIG. 3 after three rounds are executed in accordance with one embodiment. In the example of FIG. 4, the merchandise is yogurt, the location is the Baltimore, Md. area, and the early stopping metric is MAPE. In round 1, the early stopping threshold value is 10%, and the maximum iterations is 15. As shown, in round 1, the early stopping metric is reached at the $4^{th}$ iteration (i.e., 9.5), and the outputted optimized feature set used to train the algorithm to generate the first model is (1, 2, 3, 6, 10, 5, 9, 7). In round 2, the early stopping threshold value is 10%, and the maximum iterations is 12. As shown, in round 2, the early stopping metric (i.e., 8.9) is reached at the $6^{th}$ iteration, and the outputted optimized feature set used to train the algorithm to generate the first model is (1, 2, 3, 6, 10, 4, 8, 9). In round 3, the early stopping threshold value is 8%, and the maximum iterations is 15. As shown, in round 2, after the maximum iterations of 15 is reached, the early stopping threshold value has not been reached, so no optimized feature set is found in round 3. Although each example of FIG. 4 includes the same number of optional features, the actual number may vary within different iterations.

As disclosed, the functionality of embodiments of the invention automatically selects the best set of features for the given product/location with an early stop criteria which allows the machine learning tool to predict the accurate demand. The features selection can automatically allow a retailer to set up the data features at higher level but train/predict the demand with a different subset of the features for each product/location. The automated parameters tuning helps to achieve a more accurate prediction than the guess/try known approaches because embodiments explore more search space per product/location then a human being can manually process. Further, embodiments improve the performance of the computer by requiring less processing cycles and memory storage than any known solution.

Figure 5:
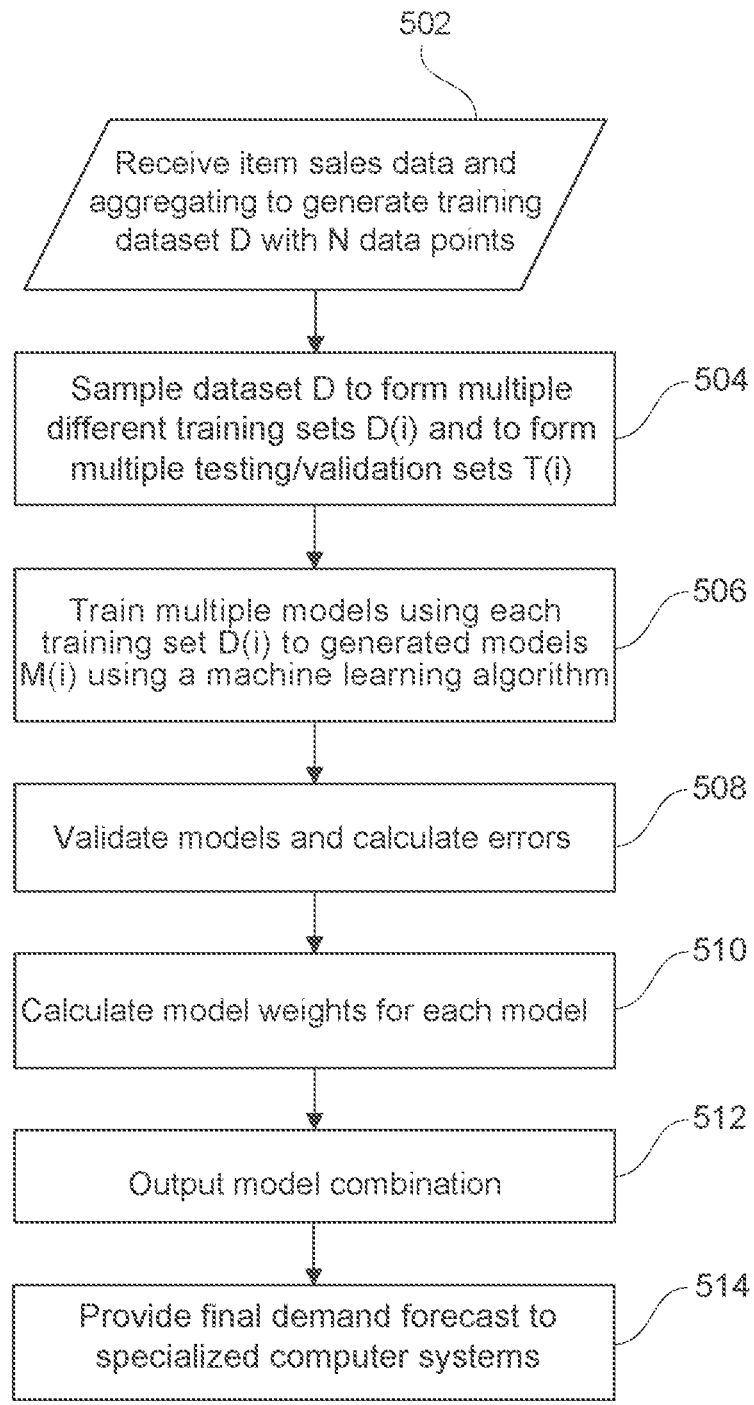
FIG. 5 is a flow diagram of the functionality of the demand forecast module of FIG. 1 when determining promotion effects at an aggregate level using multiple trained models in accordance with one embodiment.

In embodiments disclosed above, where one or more optimized feature sets are generated using the functionality of FIG. 2, embodiments use the optimized feature sets as input to forecasting algorithms to generate forecasting models. FIG. 5 is a flow diagram of the functionality of promotion effects module 16 of FIG. 1 when determining promotion effects at an aggregate level using multiple trained models in accordance with one embodiment. The multiple trained models can be generated using the functionality of FIG. 2.

At 502, historical item sales data is received for all items for all stores for a particular class/category of products.

The historical performance data includes sales data associated with the plurality of promotion components across a plurality of time periods (e.g., weeks). Examples of promotion components include, but are not limited to, a price discount component, a television advertisement component, a radio advertisement component, a newspaper advertisement component, an email advertisement component, an internet advertisement component, and an in-store advertisement component.

All the valid data points are pooled to form a training dataset D with N data points at a given aggregated level. Aggregate levels are intersections higher than SKU/store/week at which the data is pooled. An example of an aggregate level is subclass/store. The data available at this level is determined by all SKUs in a particular subclass. The aggregate levels in embodiments are typically picked to be low enough to capture the low level details of the merchandise, but also high enough that the data pool is rich enough for a robust estimation of the promotion effects.

For example, if there are 50 items in the subclass that have been selling on average for approximately a year (i.e., 52 weeks), and there are 50 retail stores in a chain, then:

$$N=50*52*50=130{,}000 \text{ data points}$$

As a result of 502, a training dataset D are formed with N data points. In this example, the given aggregate level is subclass/store.

At 504, dataset D is sampled multiple times to form multiple different training sets D(i). Embodiments generate m new training sets D(i), each of size n' (e.g., 80% of N) by randomly sampling from D uniformly and with replacement. Sampling with replacement is used to find probability with replacement. Specifically, determining the probability of some event where there is a number of data points, balls, cards or other objects, and each item is replaced every time one is chosen. For example, when sampling two with replacement, the two sample values are independent. Therefore, what is replaced by the first one does not affect what is replaced on the second. Mathematically, this means that the covariance between the two is zero.

The data points not used (i.e., that do not form part of the sampled set) for training (N-n') are used for validation as a validation/testing set T(i). For example, in one embodiment, five training sets are generated. Each training set has (130,000)*(0.8)=104,000 data points and each testing/validation set includes the 26,000 remaining data points. Each training set differs due to the random sampling.

At 506, for each training set D(i) at 204, one of multiple possible different machine algorithms are run to produce/train models. In one embodiment, for each training set D(i), one of the following machine learning algorithms are used to produce the model M(i): linear regression, Support Vector Machine ("SVM"), and Artificial Neural Networks ("ANN"). A machine learning algorithm, in general, can learn from and make predictions on data. A machine learning algorithm operates by building a model from an example training set of input observations in order to make data-driven predictions or decisions expressed as outputs, rather than following strictly static program instructions.

Training a model using a machine learning algorithm, in general, is a way to describe how the output of the model will be calculated based on the input feature set. For example, for a linear regression model, the forecast can be modeled as follows: forecast=base demand*seasonality*promotion 1*promotion 2*promotion effect 10. For different training methods, the output will be different. For example: (1) for linear regression, the training will produce the estimations for seasonality, promotion effect 1 . . . promotion effect 10; (2) for the SVM, the training will produce the "support vector" which is the set of the input data points associated with some weight; (3) for the ANN, the training output will be the final activation function and corresponding weight for each nodes.

At 508, each model is validated and errors are determined using the test set. For each model M(i), embodiments apply the test set T(i) to predict the results and calculate the root-mean-square error RMSE(i). For example, for a test data set i, in which there are 10 data points x1, . . . x10, embodiments predict the output of these 10 points based on the trained model. If the output is P1, . . . P10, then the RMSE is calculated as follows:

$$rmse = \sqrt{\left(\sum_{n=1}^{10} (xi - pi)^2\right)/10}$$

At 510, for each model, model weights are calculated. In one embodiment, for each model M(i), its weight w(i) is determined as follows:

$$w(i) = \frac{1}{1 + RMSE(i)}$$

Embodiments then determine the sum of the w(i)'s as follows:

$$S = \mathrm{sum}(w(i))$$

Finally, embodiments normalize the weight for each w(i) as follows:

$$w'(i) = \frac{w(i)}{S}$$

At 512, the model combination is output. To forecast future demand, for each data point x, M(i) is iteratively applied to the input to produce the final results y as follows:

$$y = \mathrm{sum}(f(M(i),x) * w'(i))$$

where y is the forecasted demand, and f is the function to create the forecast, corresponding to the model. For instance consider three models. For a given point x, the models yield a forecast and weights given in the below table:

| Model   | Forecast | Weight |
|---------|----------|--------|
| Model 1 | 4        | 0.5    |
| Model 2 | 4.5      | 0.3    |
| Model 3 | 3.9      | 0.2    |

The final demand forecast is calculated as:

$$y = 4*0.5 + 4.5*0.3 + 3.9*0.2 = 4.13.$$

At 514, the final demand forecast is used for manufacturing production, shipping logistics, and inventory control. The final demand forecast is sent to other specific purpose computers in one embodiment, such as an inventory control system, a manufacturing system, a shipping and logistics system, and a sales assistance system. The final demand forecast in one embodiment is in the form of individual data bits that have been translated from the demand forecast and that are stored and transmitted to other specialized computer systems, where they are stored and utilized by those systems. As a result, additional items may be manufactured, stored, shipped, etc. and items can be optimally priced.

As disclosed above, the output of the functionality of FIG. 2 can be used as input to the functionality of FIG. 5 to generate a demand forecast in one embodiment. For example, in one embodiment of FIG. 5 three algorithms are considered (e.g., linear regression, SVM, ANNs), and assume FIG. 2 generates three optimized feature sets. As discussed above, in FIG. 5 the algorithms are trained using the optimized forecasting algorithms and the result will be 9 (three times three) trained models. These nine models are combined according to their weights to create the final forecast.

FIGS. 6 and 7 illustrate an example of determining promotion effects at an aggregate level in accordance with one embodiment. In the example of FIGS. 6 and 7, assume for a retailer "A" there are 2 years of history of the yogurt category in the Atlanta, Ga. area. Assume there are 20 retail stores in the Atlanta area, and each store includes approximately 100 different yogurt UPC/SKUs.

In accordance with 502 above, there is a total of 20*100*104=2,080,000 data points for an item/store/week sales aggregate level in this simplified example that form the training dataset D, where 20 is the number of retail stores, 100 is the number of SKUs, and 104 is the number of weeks for the two year historical sales period.

It is also assumed that there are 10 different types of promotions that are offered by the retailer. The promotions are referred to as "promo 1", "promo 2", "promo 3" . . . "promo 10". In this example, the demand model is as follows:

sales=(base demand)*(seasonality)*(promo 1 effect)*
(promo 2 effect)* . . . (promo 10 effect)

The base demand can be calculated at an item/store level using known methods, such as moving average, simple exponential smoothing, etc. The seasonality can be calculated at the category/region level using known methods, such as additive and multiplicative winters exponential smoothing models. The challenge is to estimate the ten promotion effects (i.e., estimate the effects of each promotion on the sales forecast during each sales period that the promotion is in effect). In this example, because there is only two years of sales history, estimating the promotion effects at an item/store level is difficult using known estimating methods.

FIG. 6 illustrates six rounds of model estimation using the data points in accordance with one embodiment. For each round, the promotion effects for each promotion 1-10 is determined using linear regression. The same type of algorithm used in each round. For example, each round can use linear regression, SVM, neural networks, etc. After each round a set of parameters are generated that describe the training set used. The set of parameters is what is referred to as the "model." Therefore, in the example of FIG. 6, six models are obtained based on six rounds.

In round A (row 601) all available data points are used for purposes of comparison with the inventive determinations. For rounds 1-5 (rows 602-606), sampling data is used to do the estimation (per 504 of FIG. 5) and the remaining testing data is used to test/validate the model (per 508 of FIG. 5). In one embodiment, the sampling data is 80% of the data points, and the testing data is the remaining 20% of the data.

In the example shown in FIG. 6, linear regression is used for training. Since each round uses a different training data set, the estimated effects will be different for each round. The promotion effects are product/location specific, but not time period specific. The same model and methodology is used for each round.

For each of training/testing, the RMSE in col. 611 is calculated based on the testing data (per 508 of FIG. 5) and the corresponding weight w(i) and normalized weight w'(i) of each round is calculated in columns 612, 613 as disclosed above.

FIG. 7 illustrates a comparison of predictions using embodiments of the invention and actual sales.

For each week during a 13 week sales period, and for a given store/SKU (e.g., a specific type of yogurt sold at a specific retail store), row 701 provides a baseline demand, row 702 provides seasonality, and rows 702-712 provide an indication (as indicated by an "X"), for each promotion, whether that promotion was active during the corresponding week. Row 713 indicates actual sales during the corresponding time period.

As for the prediction of promotion effects, row 714 indicates the predictions of sales for each week from Round A, in which all data points are used using known methods of using all available data. Rows 715-719 indicates the predictions/estimated using each of Rounds 1-5 for each time period (using embodiments of the present invention), and row 720 is the average prediction from Rounds 1-5. Column 721 uses RMSE to show that the approach using embodiments of the invention achieves the best performance (i.e., row 720 in accordance with embodiments of the invention has a smaller RMSE than row 720 which uses known methods that use the entire data set without sampling).

Instead of estimating promotion impact working with a trimmed down data, which introduces bias, embodiments utilize the richness of the entire data set, but uses sampling to reduce the necessary processing power. Embodiments are fully automated and can be adjusted to balance performance and accuracy. Further, embodiments provide an improvement in forecast accuracy for promoted items. The forecast is one of the most important drivers of the supply chain. If it is inaccurate, allocation and replenishment perform poorly, resulting in financial loss for the company.

In general, shoppers pay special attention to promoted items. If the promotion was poorly planned, and the forecast is too high, items will remain unsold, and they need to be sold at a discount, or wastage increases. In both cases, profitability goes down. If the forecast is low, demand is not satisfied and retailers experience lost sales and low client satisfaction. Both have negative impact on the revenue. Embodiments avoid lost sales or unnecessary markdowns by balancing accuracy and reliability of the promotion/sales forecast.

As disclosed, one goal of embodiments is to select the relevant features for items to ultimately maximize forecast accuracy. A good forecast generally receives no credit. Items are always available and they sell at the full price, as opposed to discounted prices. Inventory levels should not be too high, so retailers do not have money tied up in inventory. Retailers and suppliers should be able to reliably plan workforce and production capacity.

However, if the forecast is wrong (i.e., not accurate) the picture changes dramatically. The effects can have a negative impact on many business areas. For example, if the forecast is too low, fewer than needed products arrive at the retailer and they sell out. An out of stock situation impacts a retailer through lost revenue and reduced customer satisfaction. A low forecast also impacts suppliers, which have to scale down production, and review their need for the current workforce.

If the forecast is too high, there are also negative effects. The retailers will order more than they can sell. If the products are perishable, they may go bad, increasing wastage. Even if they are not perishable, the retailers may sell the extra items at discounted prices, which negatively affects revenue. The retailers may otherwise return the merchandise to the suppliers. This impacts the suppliers because they have extra products for which there is no demand. Further, the manufacturers may waste time and money producing the wrong thing, which negatively affects the supplier's revenue.

Figure 8:
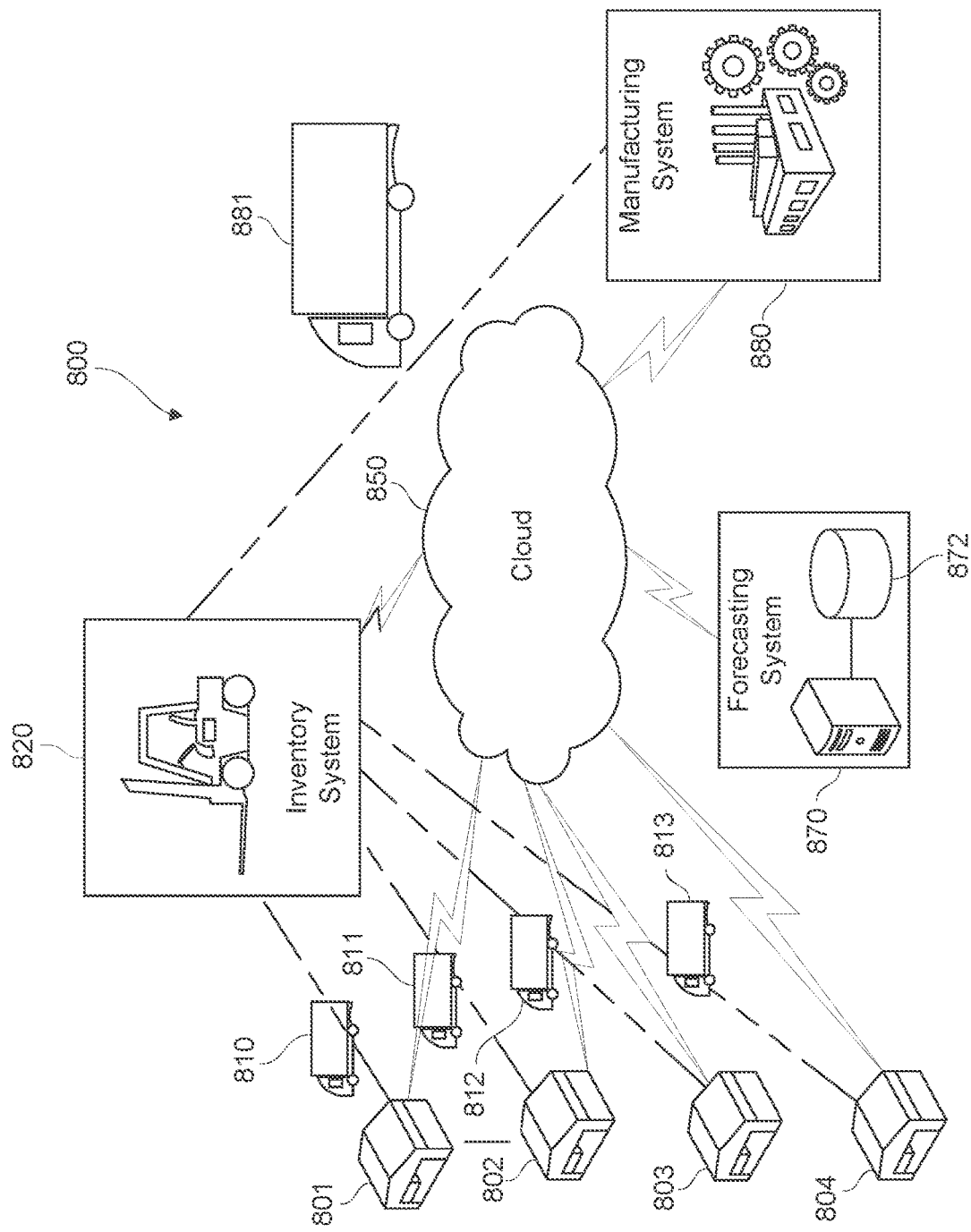
FIG. 8 illustrates an integrated manufacturing, inventory and logistics system that includes demand forecasting as disclosed herein in accordance with one embodiment.

FIG. 8 illustrates an integrated manufacturing, inventory and logistics system 800 that includes demand forecasting as disclosed herein in accordance with one embodiment. As shown in FIG. 8, system 800 can include a product forecasting system 870 that forecasts future product demand and in some instances forecasts and/or considers future demand for hundreds of thousands of products, or in some applications tens of millions or more products at one or more retail stores 801-804. Forecasting system 870 is in communication through a cloud network 850 or other type of communications network with one or more inventory systems 820 and one or more manufacturing systems 880.

Forecasting system 870 generates demand forecasting by implementing the functionality disclosed in conjunction with FIGS. 2 and 5 above. Inventory system 820 stores inventory and provides transportation logistics to deliver items to stores 801-804 using trucks 810-813 or some other transportation mechanisms. Inventory system 820 in one embodiment implements an Enterprise Resource Planning ("ERP") specialized computer system or a specialized inventory control system that uses input from forecasting system 810 to determine levels of inventories and the amount and timing of the delivery of items to stores 801-804.

Manufacturing system 880 manufactures items to be sent to inventory system 820 and provides transportation logistics to deliver the items to inventory system 820 using a truck 881 or some other transportation mechanisms. Manufacturing system 880 in one embodiment implements an ERP specialized computer system or a specialized manufacturing system that uses input from forecasting system 870 to determine an amount of items to manufacture, inventory of resources that are used for the manufacturing, and the amount and timing of the delivery of items to inventory system 820.

Forecasting system 870 can utilize information from inventory system 820, a sales tracking system (not shown) and/or databases in forecasting demand for products. In forecasting demand, forecasting system 870 attempts to predict uncharacteristic demand of one or more products that results from events, weather, social demand, economic factors and other factors. Tens, to hundreds to thousands of different variables may be tracked that can have an effect on the demand of one or more products. Changes in these variables can result in uncharacteristic demands. For example, changes in forecasted weather can be tracked, and one or more variables associated with the forecasted weather can be used in determining whether such a change is weather may have an effect on demand, and may further forecast a change in demand.

In general, the elements of FIG. 8 perform sales, manufacturing, or consumption of inventory. Retail locations/stores 801-804 for direct consumer sales exhibit the most volatile inventory patterns, due to the random nature and external factors affecting sales. However, manufacturing facilities and sites that consume inventory (such as product integrators, internet shippers, etc. products used in the local facility) also benefit from demand forecasting as disclosed herein. As disclosed, each retail location 801-804 sends sales data and historic forecast data to forecasting system 870. The sales data includes inventory depletion statistics for each item, or SKU/UPC for each sales period, typically days, in the previous sales cycles (i.e. weeks), typically 4-7 weeks of inventory cycles.

Forecasting system 870 stores the sales data in a repository 872, and employs the sales data for generating orders to replenish inventory. The orders include a set of items and a quantity for each item for maintaining the inventory level at a store 801-804.

Many retail ordering schemes rely on days of the week for sales periods and sales cycles. In one configuration, in an inventory management environment having inventory statistics, in which the inventory statistics are specific to each day of the week, inventory system 820 determines target inventory levels by gathering, for each day of the week, inventory level statistics from previous sales. Embodiments compute, based on the inventory level statistics, an inventory level for each day of the week, such that the safety stock accommodates variations in inventory between the different days of the week. Embodiments render, for each of a plurality of items, a stocking level indicative of the target inventory level including the safety stock for each day of the week. Embodiments compute an ordering quantity based on a lead time such that the ordered quantity arrives to satisfy the rendered stocking level on the determined day of the week. Identifying the actual stock levels includes identifying stock levels on the day of the week from previous weeks from the history data, thus focusing on the same day of the week over time, rather than an average of all days in the week.

In particular configurations, the disclosed embodiments may be employed in conjunction with specialized and/or particularly high volume retail sales environments. In large logistics and distribution operations, it is beneficial to load trucks as full as possible, and in the event deferral of items to a successive trip is needed, to select those items which will have a least likely chance of interrupting sales activity. Accordingly, embodiments are operable in conjunction with POS system 100 to identify high velocity or high turnover items that tend to be sold and replenished faster than other items. A UPC bar code symbol or radio-frequency identification ("RFID") on an item includes a field, designation or value, that alone or in conjunction with a database lookup, designates an item as a high velocity item appropriate for safety stock treatment as defined herein.

A high velocity item may be accommodated by identifying, for each of a plurality of items represented in an inventory database, a field for a product identifier and a field denoting a safety stock for the item, and determining, for each of the product identifiers, a product segmentation field based on product velocity indicative of increased product replenishment demands resulting from a sales volume. The disclosed embodiments determine based on the velocity field, whether to compute a safety stock, i.e. whether the overhead and burden to resupply according to the safety stock is worthwhile given the product throughput.

In other embodiments, supply logistics may invoke a delivery frequency higher than one truck a day, hence triggering a resupply window with a higher granularity. In such a case, the safety stock may be more specific than an individual day, such as a Monday AM and Monday PM, or to designate multiple delivery or time windows within a particular day of the week, such as 7:00 AM, 11:00 AM and 4:00 PM.

Embodiments, including the generated demand forecast, may be employed in implementing supply logistics and designating deliveries (i.e., trucks) and manifest (i.e., contained items) in accordance with demand and profit margins of the transported items. High velocity items might be deemed to have priority space on a particular delivery, but could further be selected based on a profit margin or markup on the included items, and items with the greatest revenue generation potential selected for inclusion.

In such a product inventory shipping environment that uses the demand forecast disclosed herein and has a plurality of transport vehicles, each vehicle (e.g., truck) is configured for receiving a fixed payload of items for delivery to a sales location for inventory replenishment. Embodiments can provide guidance in loading a delivery vehicle, by, for each item of a plurality of items including a first item and a second item, computing a safety stock and determining, based on the computed safety stock of the first item and the second item, a quantity of each of the first item and the second item to be loaded into the delivery vehicle. Embodiments recompute a truck loading quantity based on the safety stock if insufficient space is available in the delivery vehicle for the determined quantity of the first item and the second item, meaning that certain items would need to be omitted and deferred to a successive delivery.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating a model of demand of a product that comprises an optimized feature set, the method comprising:
   receiving sales history for the product;
   receiving a set of relevant features for the product and designating a subset of the relevant features as mandatory features;
   from the sales history, forming a training dataset and a validation dataset;
   randomly selecting, from the set of relevant features, one or more optional features to create a set of optional features and including the set of optional features with the mandatory features to create a first feature test set;
   training an algorithm using the training dataset and the first feature test set to generate a trained algorithm;
   calculating an early stopping metric using the trained algorithm and the validation dataset;
   repeating the randomly selecting to create a revised feature test set, the revised feature test set comprising the mandatory feature set and a different set of optional features than the first feature test set;
   repeating the training and calculating using the revised feature test set instead of the first feature test set; and
   repeating the repeating the randomly selecting and the repeating the training and calculating until the early stopping metric is below a predefined threshold;
   wherein when the early stopping metric is below the predefined threshold, the revised feature test set is the optimized feature set.

2. The method of claim 1, further comprising repeating the method to generate a plurality of optimized feature sets, where each of the optimized feature sets are input into a forecasting algorithm to generate a trained model.

3. The method of claim 1, wherein the forming the training dataset and the validation dataset comprises randomly selecting a first subset of the sales history as the training dataset, and using a remainder of the sales history as the validation dataset.

4. The method of claim 1, wherein the algorithm comprises a machine learning algorithm that comprises one of linear regression, Support Vector Machine, or Artificial Neural Networks.

5. The method of claim 1, wherein the early stopping metric comprises a mean absolute percentage error.

6. The method of claim 2, further comprising:
training multiple models corresponding to the optimized feature sets using a training set, and using a corresponding validation set to validate each trained model and calculate an error;
calculating model weights for each model;
outputting a model combination comprising for each model a forecast and a weight; and
generating a forecast of future sales based on the model combination.

7. The method of claim 6, wherein the error is a root-mean-square error (RMSE) and for each model of each training set i, the calculating model weights w(i) comprises:

$$w(i) = \frac{1}{1 + RMSE(i)}.$$

8. A non-transitory computer-readable medium having instructions stored thereon that, when executed by a-one or more processors, cause the processors to generate a model of demand of a product that comprises an optimized feature set, the generating comprising:
receiving sales history for the product;
receiving a set of relevant features for the product and designating a subset of the relevant features as mandatory features;
from the sales history, forming a training dataset and a validation dataset;
randomly selecting, from the set of relevant features, one or more optional features to create a set of optional features and including the set of optional features with the mandatory features to create a first feature test set;
training an algorithm using the training dataset and the first feature test set to generate a trained algorithm;
calculating an early stopping metric using the trained algorithm and the validation dataset;
repeating the randomly selecting to create a revised feature test set, the revised feature test set comprising the mandatory feature set and a different set of optional features than the first feature test set;
repeating the training and calculating using the revised feature test set instead of the first feature test set; and
repeating the repeating the randomly selecting and the repeating the training and calculating until the early stopping metric is below a predefined threshold;
wherein when the early stopping metric is below the predefined threshold, the revised feature test set is the optimized feature set.

9. The computer-readable medium of claim 8, the generating further comprising repeating the generating to generate a plurality of optimized feature sets, where each of the optimized feature sets are input into a forecasting algorithm to generate a trained model.

10. The computer-readable medium of claim 8, wherein the forming the training dataset and the validation dataset comprises randomly selecting a first subset of the sales history as the training dataset, and using a remainder of the sales history as the validation dataset.

11. The computer-readable medium of claim 8, wherein the algorithm comprises a machine learning algorithm that comprises one of linear regression, Support Vector Machine, or Artificial Neural Networks.

12. The computer-readable medium of claim 8, wherein the early stopping metric comprises a mean absolute percentage error.

13. The computer-readable medium of claim 9, further comprising:
training multiple models corresponding to the optimized feature sets using a training set, and using a corresponding validation set to validate each trained model and calculate an error;
calculating model weights for each model;
outputting a model combination comprising for each model a forecast and a weight; and
generating a forecast of future sales based on the model combination.

14. The computer-readable medium of claim 13, wherein the error is a root-mean-square error (RMSE) and for each model of each training set i, the calculating model weights w(i) comprises:

$$w(i) = \frac{1}{1 + RMSE(i)}.$$

15. A retail sales forecasting system that forecasts demand for a product using an optimized feature set, the system comprising:
one or morea processors coupled to a storage device that implements a demand forecasting module comprising:
receiving sales history for the product;
receiving a set of relevant features for the product and designating a subset of the relevant features as mandatory features;
from the sales history, forming a training dataset and a validation dataset;
randomly selecting, from the set of relevant features, one or more optional features to create a set of optional features and including the set of selected optional features with the mandatory features to create a first feature test set;
training an algorithm using the training dataset and the first feature test set to generate a trained algorithm;
calculating an early stopping metric using the trained algorithm and the validation dataset;
repeating the randomly selecting to create a revised feature test set, the revised feature test set comprising the mandatory feature set and a different set of optional features than the first feature test set;
repeating the training and calculating using the revised feature test set instead of the first feature test set; and
repeating the repeating the randomly selecting and the repeating the training and calculating until the early stopping metric is below a predefined threshold;

wherein when the early stopping metric is below the predefined threshold, the revised feature test set is the optimized feature set.

16. The retail sales forecasting system of claim 15, further comprising generating a plurality of optimized feature sets, where each of the optimized feature sets are input into a forecasting algorithm to generate a trained model.

17. The retail sales forecasting system of claim 15, wherein the forming the training dataset and the validation dataset comprises randomly selecting a first subset of the sales history as the training dataset, and using a remainder of the sales history as the validation dataset.

18. The retail sales forecasting system of claim 15, wherein the algorithm comprises a machine learning algorithm that comprises one of linear regression, Support Vector Machine, or Artificial Neural Networks.

19. The retail sales forecasting system of claim 15, wherein the early stopping metric comprises a mean absolute percentage error.

20. The retail sales forecasting system of claim 16, further comprising:
   training multiple models corresponding to the optimized feature sets using a training set, and using a corresponding validation set to validate each trained model and calculate an error;
   calculating model weights for each model;
   outputting a model combination comprising for each model a forecast and a weight; and
   generating a forecast of future sales based on the model combination.

* * * * *

UNITED STATES PATENT AND TRADEMARK OFFICE
CERTIFICATE OF CORRECTION

| | | |
|---|---|---|
| PATENT NO. | : 11,599,753 B2 | Page 1 of 1 |
| APPLICATION NO. | : 15/844991 | |
| DATED | : March 7, 2023 | |
| INVENTOR(S) | : Lei et al. | |

It is certified that error appears in the above-identified patent and that said Letters Patent is hereby corrected as shown below:

In the Drawings

On sheet 5 of 10, in FIG. 4B, Line 19, delete "interation" and insert -- iteration --, therefor.

In the Specification

In Column 1, Line 16, delete "network" and insert -- network. --, therefor.

In Column 6, Line 18, delete "relationship" and insert -- relationship. --, therefor.

In Column 7, Line 56, delete "("0")." and insert -- ("O"). --, therefor.

In Column 8, Line 15, delete "("MAPF")" and insert -- ("MAPE") --, therefor.

In Column 11, Line 15, delete "))/10" and insert -- )/10 --, therefor.

In the Claims

In Column 16, Line 60, in Claim 1, before "randomly" delete "repeating the", therefor.

In Column 17, Line 34, in Claim 8, after "by" delete "a-".

In Column 17, Line 60, in Claim 8, before "randomly" delete "repeating the", therefor.

In Column 18, Line 41, in Claim 15, delete "morea" and insert -- more --, therefor.

In Column 18, Line 52, in Claim 15, after "of" delete "selected", therefor.

In Column 18, Line 65, in Claim 15, before "randomly" delete "repeating the", therefor.

Signed and Sealed this
Second Day of January, 2024

*Katherine Kelly Vidal*
Katherine Kelly Vidal
*Director of the United States Patent and Trademark Office*